July 24, 1951  N. T. JENSEN  2,561,798
FOOD PROTECTING BLANKET
Filed Feb. 9, 1948
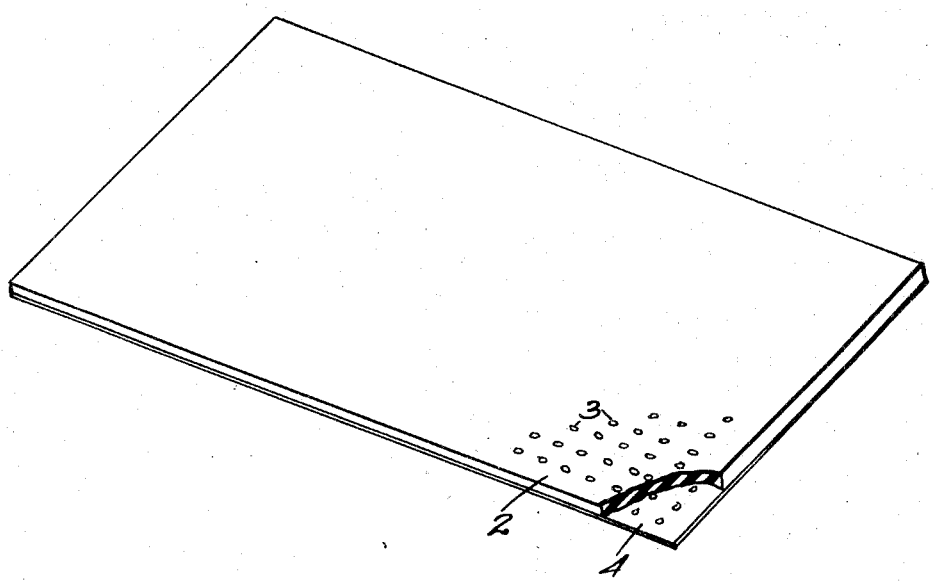
Nels T. Jensen,
INVENTOR,
BY his attorney,
Frederick E. Moynard.

Patented July 24, 1951

2,561,798

UNITED STATES PATENT OFFICE 2,561,798

FOOD PROTECTING BLANKET

Nels T. Jensen, San Bernardino, Calif., assignor of one-half to Chester Sheets, San Bernardino, Calif.

Application February 9, 1948, Serial No. 7,278

1 Claim. (Cl. 299—20)

This invention is a food protector in the form of a pliable blanket to be laid over various food bodies.

When moist food bodies, especially pieces of meat, are placed in refrigerators for storage or for display the chilled air tends to rapidly dehydrate the meat pieces, and, also, the exposed surfaces of the meat are unattractively darkened by natural oxidation. Both of these effects are highly objectionable.

It is therefore an object of this invention to provide a simple, practical, effective, low cost, sanitary and easily handled blanket form of protector which will hold a considerable volume of water for a long period, and therefore which will, when laid against or upon meat pieces in refrigerators greatly retard dehydration of the meat by the chilled air. And while in surface contact with the meat to be protected will practically prevent unsightly oxidation.

A further purpose of the invention is to provide a durable and thoroughly washable blanket having a long life of repeated use.

Noticeably, a purpose of the invention is to provide a blanket of such nature and material that while as a mass it will take water into mass interstices yet the physical nature of the material is such that it, in itself, is water-proof; and is preferably of sponge rubber or its substantial equivalent.

The invention resides in certain advancements in this art as set forth in the ensuing disclosure and having, with the above, additional objects and advantages as will develop hereinafter, and whose construction, combinations and details of means will be made manifest in the following description of the herewith illustrative embodiment; it being understood that modifications, variations and adaptations may be resorted to within the scope, spirit and principles of the invention as it is claimed in conclusion hereof.

The drawing is a sectional perspective of the blanket.

The blanket is preferably embodied in the form of a sheet of spongy rubber 2 which has been deodorized and having or being given a suitable color. Such a material while naturally waterproof will take into its interstices a considerable amount of water which will gradually evaporate when the blanket is laid against or draped upon a body of food meat, for instance, stored or displayed in a given refrigerator. The water thus supplied to the cold air will reduce the speed and amount of water taken from the meat body and this keeps in better condition and appearance by reason of the protecting blanket.

To increase moisture holding area of the rubber blanket it is generously perforated throughout, from top to bottom, by vent holes 3 whose wall interstices will take a charge of fresh water to be given off as vapor to the cold, refrigerator air.

To the bottom of the blanket 2 is suitably affixed a suitable, fibrous mat 4 constituting a bed or spacer to separate the rubber blanket from direct contact; should it be desired in some instances of use of the protecting blanket. This mat will catch seepage water, in case of excess, from the blanket pores and by absorption thereof will equally diffuse the moisture over all the contacted surface of the food body to be protected against undesired dehydration—by action of the chilled air.

The blanket sheet can be repeatedly thoroughly cleansed in any desired manner to remove water-absorbed odors and discolorations on the rubber surface.

The fibrous mat may be of sheet cotton or any other appropriate sheet or mat-like material.

What is claimed is:

A food protecting cover consisting of a pliant sheet of inherently porous, suitably colored, deodorized sponge rubber which generally throughout its area is penetrated from face to face by small perforations whereby to increase its water retaining capacity.

NELS T. JENSEN.

REFERENCES CITED

The following references are of record in the file of this patent:

UNITED STATES PATENTS

| Number | Name | Date |
|---|---|---|
| 438,998 | Glew | Oct. 21, 1890 |
| 1,474,684 | Osterhoudt | Nov. 20, 1923 |
| 1,538,277 | Dula | May 19, 1925 |
| 1,841,889 | Grunwald | Jan. 19, 1932 |
| 1,871,419 | McKee | Aug. 9, 1932 |
| 2,194,649 | Fischer | Mar. 26, 1940 |
| 2,371,967 | Lohner et al. | Apr. 20, 1945 |